United States Patent
Borgholthaus

(10) Patent No.: US 9,434,303 B2
(45) Date of Patent: Sep. 6, 2016

(54) SYSTEMS AND METHODS FOR IN-VEHICLE NETWORK CONTROLLED MEDIA-SYNCHRONIZED LIGHT SHOW

(71) Applicant: Semiconductor Components Industries, LLC, Phoenix, AZ (US)

(72) Inventor: Michael Borgholthaus, Novi, MI (US)

(73) Assignee: SEMINCONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/675,117

(22) Filed: Mar. 31, 2015

(65) Prior Publication Data

US 2015/0321603 A1    Nov. 12, 2015

Related U.S. Application Data

(60) Provisional application No. 61/989,557, filed on May 7, 2014.

(51) Int. Cl.
*B60Q 3/02* (2006.01)
*H04L 12/64* (2006.01)

(52) U.S. Cl.
CPC .......... *B60Q 3/0293* (2013.01); *B60Q 3/0279* (2013.01); *H04L 12/6418* (2013.01)

(58) Field of Classification Search
CPC .. B60Q 3/0293; B60Q 3/0279; B60Q 1/143; B60Q 2300/314; H05B 33/0857; H05B 33/0863; H05B 37/0245; H05B 37/0272; H05B 37/029; H05B 33/0842; H05B 37/0254; H05B 33/0845; H05B 33/086; H05B 37/0218
See application file for complete search history.

(56) References Cited

U.S. PATENT DOCUMENTS

2011/0169293 A1* 7/2011 Counts ...................... B60N 2/01
                                                                                  296/65.01

OTHER PUBLICATIONS

Instructables. Printed Jun. 9, 2012. "Under Seat Music synced Lights for Car." Mar. 23, 2012. http://www.instructables.com/id/Under-Seat-Music-synced-Lights-for-Car/.
Ford. Printed Mar. 2, 2014. "Interior Available Ambient Lighting." http://www.ford.com/cars/taurus/features/Feature32/.

* cited by examiner

*Primary Examiner* — Jany Richardson
(74) *Attorney, Agent, or Firm* — Patent Law Group: Atkins and Associates, P.C.

(57) ABSTRACT

In one embodiment, the in-vehicle network controller sends instructions, via a communication signal, to the lighting network wherein the lighting network is synchronized with a media source by using a communication protocol which controls features of the lighting network such as timing, fading, color, intensity, and enable/disable.

20 Claims, 2 Drawing Sheets

SYSTEMS AND METHODS FOR IN-VEHICLE NETWORK CONTROLLED MEDIA-SYNCHRONIZED LIGHT SHOW

CROSS REFERENCE TO RELATED APPLICATIONS

This application claims the benefit of the U.S. Provisional Application No. 61/989,557, filed on May 7, 2014, which is incorporated herein by reference.

BACKGROUND

Embodiments disclosed in the present invention relate generally to electrical technology, and more specifically to a system and method for in-vehicle network-controlled lighting.

Most all vehicles are equipped with interior lighting that may be turned on or off by an occupant, and interior lighting that may turn on automatically when a door is opened, such as the interior lightings located on the door panels or the dome lighting. The interior lighting may be controlled by the body control module (BCM). The body control module is an electrical control unit that is responsible for monitoring, and controlling a variety of different electronic components in a vehicle's body. In vehicles, the BCM has been configured to controlled components such as the power windows, air conditioning, power mirrors, immobilizer system, power locks, and power seats. The BCM communicates with all the other on-board computers using the vehicle's bus. The BCM may also control components such as load drivers, and actuating relays which control certain actions such as dimming the overhead light, or locking the doors.

In an effort to enhance user experience, infotainment centers have been offered by many manufactures as a standard option in new vehicles. The infotainment center typically performs tasks such managing and playing audio content, utilizing navigation for driving, delivering rear-seat entertainment such as movies, games, social networking, listening to incoming and sending outgoing SMS text messages, making phone calls, and accessing Internet-enabled or smartphone-enabled content such as traffic conditions, sports scores and weather forecasts.

In-vehicle network (IVN)-controlled ambient lighting is becoming increasingly popular in vehicles. More recently, vehicle manufactures have been offering ambient lighting as an optional feature. Ambient lighting is the soft illumination which may be located around the center console, door handles and pulls, cupholders and sometimes completely across the dash and in the footwells. This ambient lighting may also feature dimming capabilities, fading, and color. The ambient lighting may be kept on while the vehicle is in driving mode. The ambient lighting may be controlled by an ambient lighting module. The ambient lighting module may be electrically connected to the body control module or may be contained within the body control module.

In order to create light shows within a vehicle, owners have been able to synchronize music or video to lighting by installing a stand-alone system with after-market lights which can be mounted under the dashboard, in the door panels, and under the seats. However, the after-market lights must be affixed by the owner and must be powered by an external source, which can be bulky and unattractive. In addition, the owner must purchase and install a module configured to send signals from an audio source to the lighting system.

Accordingly, it would be desirable to have an in-vehicle lighting system that would allow a user to synchronize an audio or video source through the vehicle's existing modules, such as the body control module, ambient lighting module or infotainment center, to the factory-installed ambient lighting (in-vehicle lighting network) located inside the vehicle without adding additional after-market lighting or attempting to modify the existing lighting system.

For simplicity and clarity of illustration, elements in the figures are not necessarily drawn to scale, and the same reference numbers in different figures denote generally the same elements. Additionally, descriptions and details of well-known steps and elements are omitted for simplicity of the description. It will be appreciated by those skilled in the art that the words "during", "while", and "when" as used herein relating to circuit operation are not exact terms that mean an action takes place instantly upon an initiating action but that there may be some small but reasonable delay, such as propagation delay, between the reaction that it initiated by the initial action. Additionally, the term "while" means that a certain action occurs at least with some portion of duration of the initiating action. The use of the word "approximately" or "substantially" means that a value of an element has a parameter that is expected to be close to a stated value or position. However, as is well known in the art there are always minor variances that prevent the value or positions from being exactly as stated. It is well established in the art that variances of up to at least 10 percent (10%) are reasonable variances from the ideal goal of exactly as described. The terms "first", "second", "third" and the like in the Claims and/or in the Detailed Description of Drawings, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

Figure 1:
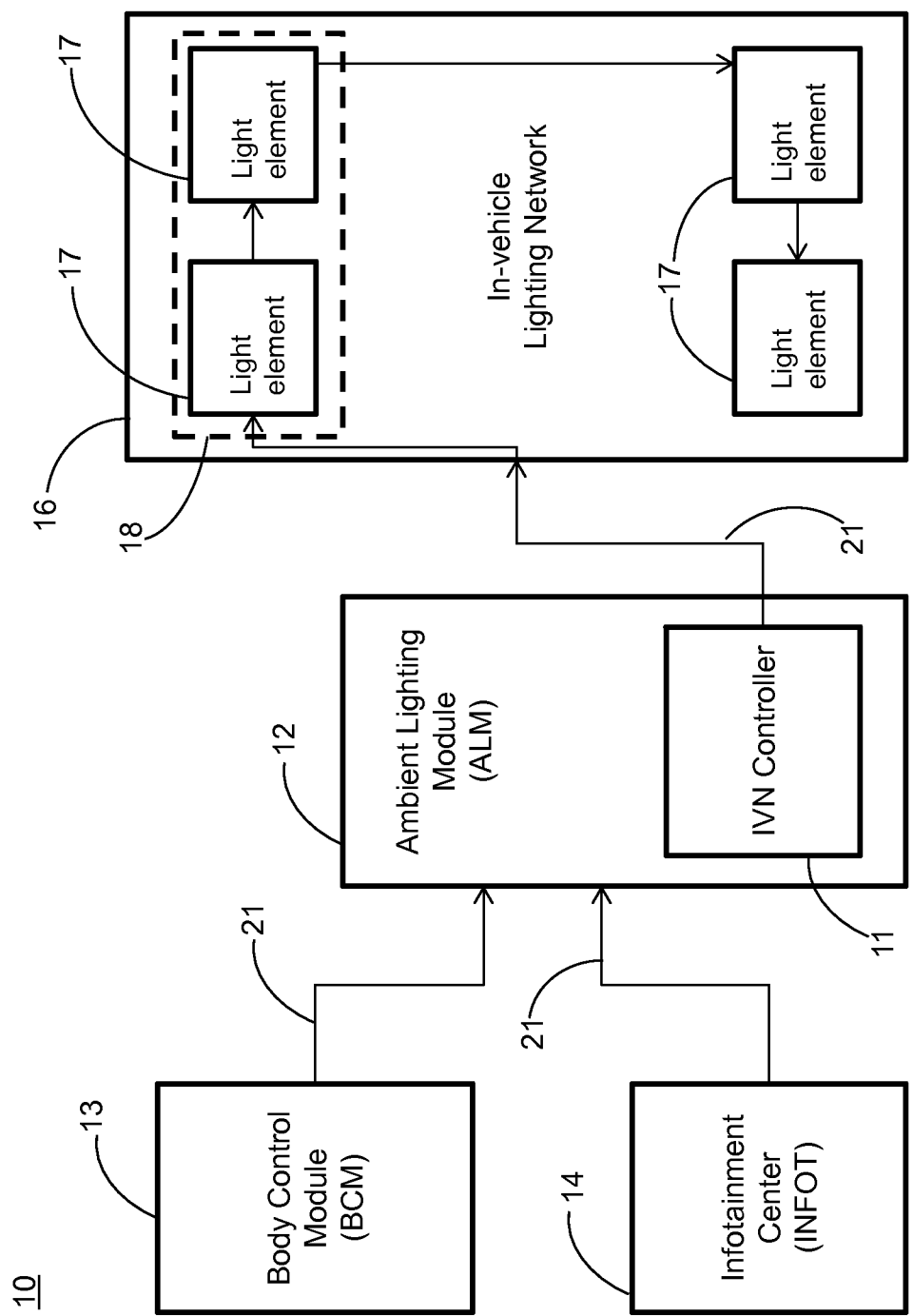
FIG. 1 illustrates an in-vehicle network controlled lighting system in accordance with an embodiment of the present invention.

FIG. 1 illustrates an in-vehicle network controlled lighting system 10 in accordance with one embodiment. In one embodiment, the in-vehicle network controlled lighting system 10 may include an infotainment center 14, a body control module 13, an ambient lighting module 12, an in-vehicle network controller 11, and an in-vehicle lighting network 16.

In accordance with an embodiment, the infotainment center 14 may receive communication from a media source. The infotainment center 14 may receive the communication from the media source by physical connection, electromagnetic transmission, or electronic transmission. The media source may include video or audio, and may be in the form of a file from, for example, a mobile device, internal storage device, radio, or other storage device. The media source may also include streaming media sources, such as video or audio. The infotainment center 14 may process the media source and send a communication signal 21 to be received by the body control module 13, the ambient lighting module 12, or the in-vehicle network controller 11. The present embodiment, shown in FIG. 1, illustrates the infotainment center 14 sending a communication signal 21 to the ambient lighting module 12. The infotainment center 14 may also be equipped to read instruction code contained within the media source. The instruction code may provide the infotainment center 14 with pre-programmed code which is then communicated to the ambient lighting module 12 through a communication signal 21. The procedure of converting a media source into instruction code or processing existing instruction code is known to those of ordinary skill in the art.

In accordance with an embodiment, the ambient lighting module 12 receives communication signals 21 from the infotainment center 14. The ambient lighting module 12, may send a communication signal 21 to the in-vehicle lighting network 16. The communication signal 21 sent to the lighting network 16 may be addressed to an individual light element 17, or may be addressed to a specific group of light elements 17. The light element(s) 17, (18) may be light emitting diodes (LEDs), incandescent lights, lasers, or any other type of lighting source. The communication signal 21 sent from the ambient lighting module 12 to the lighting network 16 may control features of the light element(s) 17, (18) such as timing, fading, color, intensity, and enable/disable.

In accordance with an embodiment, the in-vehicle lighting network 16 may be synchronized to a media source using an in-vehicle network protocol such as local interconnect network (LIN), or controller area network (CAN), FlexRay, Ethernet or other suitable communication protocol. The synchronized in-vehicle lighting may be produced by a pre-programmed instruction code or may be produced by real-time processing of the media source by the infotainment center 14. The synchronized light show may be produced, for example by configuring the instruction code or real-time processing to flash the lights in conjunction with the bass or beat of a media source. The in-vehicle lighting network may include one light element 17 or a group of light elements 18. The individual light element 17 may have a network module (not shown) attached which is capable of receiving and reading the communication signal 21 sent from the in-vehicle network controller 11. The network module may have the ability to perform the instructions received from the in-vehicle network controller 11. The network module(s) may be configured to perform the given instructions by comparing the address or group of addresses to its own. For example, if instruction code for a specific address is given, the light element with that specific address performs the given instruction.

In accordance with an embodiment, the communication signals 21 may be controlled by implementing a communication protocol, such as local interconnect network (LIN), or controller area network (CAN). The communication protocol may be configured to have the ability to override the synchronized lighting instruction.

In accordance with an embodiment, the body control module 13 may communicate with other on-board computers using the vehicle's bus, and may control components such as the power windows, air conditioning, power mirrors, immobilizer system, power locks, and power seats. The BCM may also control components such as load drivers, and actuating relays which control certain actions such as dimming the interior lights, or locking the doors. The body control module 13 may override the synchronized in-vehicle lighting instructions in order to perform operations from other components in the vehicle such as operating power windows, air conditioning, power mirrors, immobilizer system, power locks, and power seats.

In accordance with an embodiment, the in-vehicle network controller 11 communicates with the in-vehicle lighting network 16 by a communication protocol such as LIN or CAN. Communication signals 21 sent by the communication protocol may contain instruction code for individually addressed light elements 17. In one embodiment, the communication signal 21 may contain instruction code for a plurality of light elements having a group address.

In accordance with an embodiment, the communication signal 21 from the infotainment center 14 to the ambient lighting module 12 may use a communication protocol such as local interconnect network (LIN), or controller area network (CAN), FlexRay, Ethernet. The communication signal from the in-vehicle network controller 11 to the lighting network 16 may use a different communication protocol than the communication protocol used between the infotainment center 14 and the ambient lighting module 12. For example, the communication protocol used in the communication signal 21 from the infotainment center 14 to the ambient lighting 160 module may be Ethernet, but the commination protocol used in the communication signal 21 from the in-vehicle network controller 11 to the lighting network 16 may be LIN.

Figure 2:
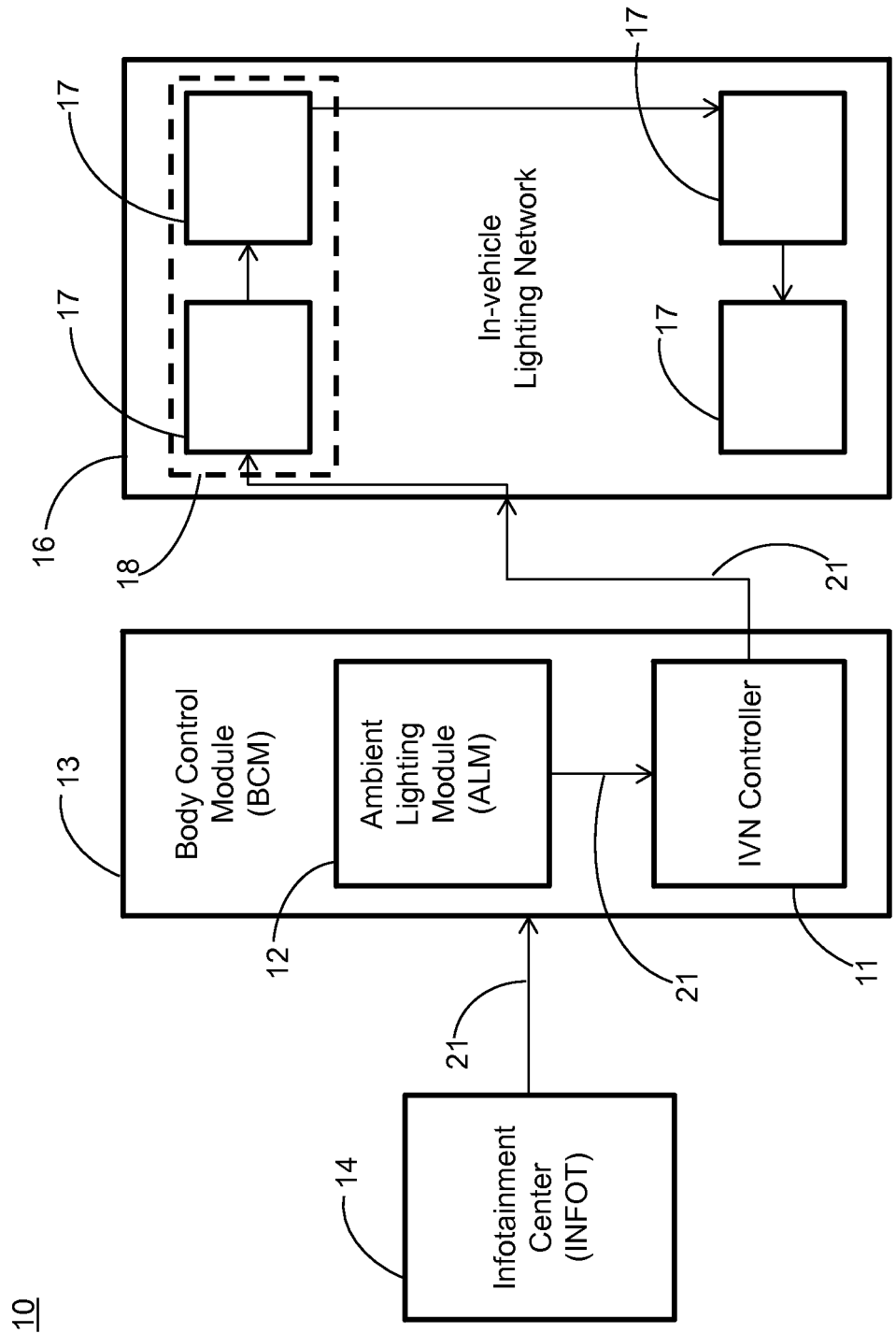
FIG. 2 illustrates an in-vehicle network controlled lighting system in accordance with an embodiment of the present invention.

FIG. 2 illustrates an in-vehicle network controlled lighting system 10 in accordance with a second embodiment. In one embodiment, the in-vehicle network controlled lighting system 10 may include an infotainment center 14, a body control module 13, an ambient lighting module 12, an in-vehicle network controller 11, and an in-vehicle lighting network 16.

In accordance with an embodiment, the infotainment center 14 may receive communication from a media source. The infotainment center 14 may receive the communication from the media source by physical connection, electromagnetic transmission, or electronic transmission. The media source may include video or audio, and may be in the form of a file from, for example, a mobile device, internal storage device, radio, or other storage device. The media source may also include streaming media sources, such as video or audio. The infotainment center 14 may process the media source and then communicate a signal to be used by the body control module 13, the ambient lighting module 12, or the in-vehicle network controller 11. The infotainment center 14 may also be equipped to read instruction code contained within the media source. The instruction code may provide the infotainment center 14 with pre-programmed code which is then communicated to the body control module 12. The procedure of converting a media source into instruction code or processing existing instruction code is known to those of ordinary skill in the art.

In accordance with an embodiment, the body control module 13 receives communication signals 21 from the infotainment center 14. In one embodiment, the ambient lighting module 12 may be contained within the body control module 13. The body control module 13 may send a communication signal 21, via the ambient lighting module 12, to the in-vehicle lighting network 16. The communication signal 21 sent to the lighting network 16 may be addressed to an individual light element 17, or may be addressed to a specific group of light elements 18. The light element(s) 17,18 may contain light emitting diode(s), incandescent light(s), laser(s), or any other type of lighting source. The communication signal 21 sent from the ambient lighting module 12 to the lighting network 16 may control features of the light elements such as timing, fading, color, intensity, and enable/disable.

In accordance with an embodiment, the in-vehicle lighting network 16 may be synchronized to a media source using an in-vehicle network communication protocol such as local interconnect network (LIN), or controller area network (CAN), FlexRay, Ethernet or other suitable communication protocol. The synchronized in-vehicle lighting may be produced by a pre-programmed instruction code or may be produced by real-time processing of the media source by the infotainment center 14. The synchronized light show may be produced, for example by configuring the instruction code or real-time processing to flash the lights in conjunction with the bass or beat of a media source. The in-vehicle lighting network 16 may include one light element 17 or a group of light elements 18. The individual light element 17 may have a network module (not shown) attached which is capable of receiving and reading the communication signal 21 sent from the in-vehicle network controller 11. The network module may have the ability to perform the instructions received from the in-vehicle network controller 11. The network module(s) may be configured to perform the given instructions by comparing the address or group of addresses to its own. For example, if instruction code for a specific address is given, the light element with that specific address performs the given instruction.

In accordance with the present embodiment, the communication signals 21 may be controlled by implementing a communication protocol, such as local interconnect network (LIN), or controller area network (CAN). The communication protocol may be configured to have the ability to override the synchronized lighting instruction.

In accordance with one embodiment, the body control module 13 may communicate with other on-board computers using the vehicle's bus, and may control components such as the power windows, air conditioning, power mirrors, immobilizer system, power locks, and power seats. The BCM may also control components such as load drivers, and actuating relays which control certain actions such as dimming the interior lights, or locking the doors. The body control module 13 may override the synchronized in-vehicle lighting instructions in order to perform operations from other components in the vehicle such as operating power windows, power mirrors, immobilizer system, power locks, and power seats. The body control module 13, may also override the synchronized in-vehicle lighting instructions when the doors are opened in order to illuminate the vehicle's interior lights, such as the dome light.

In accordance with one embodiment, the in-vehicle network controller communicates with the in-vehicle lighting network 16 by a communication protocol such as LIN or CAN. Communication signals 21 sent by the communication protocol may contain instruction code for individually addressed light elements 17. In one embodiment, the communication signal 21 may contain instruction code for a plurality of light elements 18 having a group address.

In accordance with an embodiment, the communication signal 21 from the infotainment center 14 to the body control module 13 may use a communication protocol such as local interconnect network (LIN), or controller area network (CAN), FlexRay, Ethernet. The communication signal from the in-vehicle network controller 11 to the lighting network 16 may use a different communication protocol than the communication protocol used between the infotainment center 14 and the body control module 13. For example, the communication protocol used in the communication signal 21 from the infotainment center 14 to the body control module 13 may be Ethernet, but the communication protocol used in the communication signal 21 from the in-vehicle network controller 11 to the lighting network 16 may be LIN.

In accordance with another embodiment, the infotainment center 14 may send a communication signal directly to the in-vehicle lighting network 16. The communication signal 21 sent to the lighting network 16 may be addressed to an individual light element 17, or may be addressed to a specific group of light elements 18. The light element(s) 17,18 may contain light emitting diode(s), incandescent light(s), laser(s), or any other type of lighting source. The communication signal 21 sent from the ambient lighting module 12 to the lighting network 16 may control features of the light elements, such as timing, fading, color, intensity, and enable/disable.

In accordance with the present embodiment, the in-vehicle lighting network 16 may be synchronized to a media source using an in-vehicle network communication protocol such as local interconnect network (LIN), or controller area network (CAN), FlexRay, Ethernet or other suitable communication protocol. The synchronized in-vehicle lighting may be produced by a pre-programmed instruction code or may be produced by real-time processing of the media source by the infotainment center 14. The in-vehicle lighting network may include one light element 17 or a group of light elements 18. The individual light element 17 may have a network module (not shown) attached, which is capable of receiving and reading the communication signal 21 sent from the in-vehicle network controller 11. The network module may have the ability to perform the instructions received from the in-vehicle network controller 11. The network module(s) are able to perform the given instructions by comparing the address or group of addresses to its own. For example, if instruction code for a specific address is given, the light element with that specific address performs the given instruction.

In accordance with the present embodiment, the body control module 13 may communicate with other on-board computers using the vehicle's bus, and may control components such as the power windows, air conditioning, power mirrors, immobilizer system, power locks, and power seats. The body control module 13 may also control components such as load drivers, and actuating relays which control certain actions such as dimming the interior lights, or locking the doors. The body control module 13 may override the synchronized in-vehicle lighting instructions in order to perform operations from other components in the vehicle such as operating power windows, power mirrors, immobilizer system, power locks, and power seats. The body control module 13, may also override the synchronized in-vehicle lighting instructions when the doors are opened in order to illuminate the vehicle's interior lights, such as the dome light.

In accordance with the present embodiment, the in-vehicle network controller communicates with the in-vehicle lighting network 16 by a communication protocol such as LIN or CAN. Communication signals 21 sent by the communication protocol may contain instruction code for individually addressed light element. In one embodiment, the communication signal 21 may contain instruction code for a plurality of light elements having a group address.

From all the foregoing, one skilled in the art can determine that according to one embodiment, an in-vehicle lighting system (for example element 10) comprises: an in-vehicle network controller (for example element 11); an in-vehicle lighting network (for example element 16), comprising at least one addressable light element (for example element 17), wherein the at least one addressable light element receives a communication signal (for example element 21) from the in-vehicle network controller (for example element 11) using a communication protocol; wherein the at least one addressable light element (for example element 17) is synchronized to a media source; and wherein the communication protocol (for example element 21) is configured to have the ability to override the communication signal (for example element 21) sent from the in-vehicle network controller (for example element 11) to the at least one addressable light element (for example element 17). The in-vehicle lighting system (for example element 10) may also comprise a body control module (for example element 13), an ambient lighting module (for example element 12), or an infotainment center (for example element 14). The light element (for example element 17) may be individually addressed or may be addressed in a group (for example element 18).

From all the foregoing, one skilled in the art can determine that according to another embodiment, a method for forming an in-vehicle lighting system comprises: providing an in-vehicle network controller (for example element 11); providing an in-vehicle lighting network (for example element 16), comprising at least one light element (for example element 17), wherein the at least one addressable light element receives a communication signal (for example element 21) from the in-vehicle network controller (for example element 11) using a communication protocol; wherein the at least one addressable light element (for example element 17) is synchronized to a media source; and wherein the communication protocol is configured to have the ability to override the communication signal (for example element 21) sent from the in-vehicle network controller (for example element 11) to the at least one addressable light element (for example element 17). The method for forming an in-vehicle lighting system (for example element 10) may also comprise providing a body control module (for example element 13), providing an ambient lighting module (for example element 12), or providing an infotainment center (for example element 14). The light element (for example element 17) may be individually addressed or may be addressed in a group (for example element 18).

In view of all the above, it is evident that a novel system and method is disclosed. Included in one embodiment, among other features, is an in-vehicle network controller 11 and an in-vehicle lighting network 16, wherein the in-vehicle lighting network 16 is synchronized with a media source. For example, an audio file may be synchronized to the in-vehicle lighting network 16 by sending instruction code, using a communication protocol via a communication signal 21, to individually-addressed light elements 17 in the in-vehicle lighting network 16. The instruction code may provide instructions such as timing, fading, color, intensity, and enable/disable, which allows the light elements 17 to be synchronized to the audio file.

While the subject matter of the invention is described with specific preferred embodiments and example embodiments, the foregoing drawings and descriptions thereof depict only typical embodiments of the subject matter, and are not therefore to be considered limiting of its scope. It is evident that many alternatives and variations will be apparent to those skilled in the art.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of the invention. Furthermore, while some embodiments described herein include some but not other features included in other embodiments, combinations of features of different embodiments are meant to be within the scope of the invention, and form different embodiments, as would be understood by those skilled in the art.

I claim:

1. An in-vehicle lighting system comprising:
   an in-vehicle lighting network, including a network addressable light element;
   an ambient lighting module (ALM) coupled to the in-vehicle lighting network;
   an infotainment center coupled to the ALM and configured to control the network addressable light element through the ALM and in-vehicle lighting network; and
   a body control module (BCM) coupled to the ALM and configured to control the network addressable light element through the ALM and in-vehicle lighting network.

2. The system of claim 1, wherein the network addressable light element is individually addressed.

3. The system of claim 1, wherein the network addressable light element is addressed in a group.

4. The system of claim 1, wherein the network addressable light element includes a network module configured to receive and perform an instruction from the ALM.

5. The system of claim 4, wherein the infotainment center is configured to read the instruction from a media source and communicate the instruction to the ALM.

6. The system of claim 4, wherein the infotainment center is configured to generate the instruction and communicate the instruction to the ALM.

7. A method for forming an in-vehicle lighting system comprising:
   providing an in-vehicle lighting network, including a network addressable light element;
   providing an ambient lighting module (ALM) coupled to the in-vehicle lighting network and configured to transmit a first instruction to the network addressable light element through the in-vehicle lighting network; and
   providing an infotainment center coupled to the ALM and configured to transmit a second instruction to the network addressable light element through the ALM and in-vehicle lighting network.

8. The method of claim 7, wherein the first instruction and second instruction address the network addressable light element individually.

9. The method of claim 7, wherein the first instruction and second instruction address the network addressable light element in a group.

10. The method of claim 7 further including providing a body control module (BCM) configured to provide the first instruction to the ALM.

11. The method of claim 7, further including configuring the infotainment center to read the second instruction from a media source.

12. The method of claim 7, further including configuring the infotainment center to generate the second instruction by processing a media source in real-time.

13. The method of claim 7, further including configuring the ALM to override the second instruction with the first instruction.

14. A method of controlling an in-vehicle lighting system, comprising:

providing an in-vehicle lighting network including an addressable light element;

connecting an infotainment center to the in-vehicle lighting network; and transmitting an instruction from the infotainment center to the addressable light element, wherein the instruction includes an address.

15. The method of claim 14, further including:

providing an ambient light module (ALM), wherein the infotainment center is connected to the in-vehicle lighting network through the ALM; and configuring the ALM to override the instruction.

16. The method of claim 14, further including transmitting the instruction using an in-vehicle network protocol.

17. The method of claim 16, further including using local interconnect network (LIN), controller area network (CAN), FlexRay, or Ethernet as the in-vehicle network protocol.

18. The method of claim 14, further including providing a network module on the addressable light element.

19. The method of claim 18, further including executing the instruction on the addressable light element with the network module.

20. The method of claim 18, further including:

receiving the instruction with the network module; and comparing the address of the instruction to an address of the addressable light element.

\* \* \* \* \*